United States Patent
Prest et al.

(10) Patent No.: US 10,969,600 B2
(45) Date of Patent: Apr. 6, 2021

(54) ELECTRONIC DEVICES WITH OPTICAL MARKERS

(71) Applicant: Apple Inc., Cupertino, CA (US)

(72) Inventors: Christopher D. Prest, San Francisco, CA (US); Marta M. Giachino, Palo Alto, CA (US); Matthew S. Rogers, San Jose, CA (US); Que Anh S. Nguyen, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/143,812

(22) Filed: Sep. 27, 2018

(65) Prior Publication Data

US 2019/0278098 A1    Sep. 12, 2019

Related U.S. Application Data

(60) Provisional application No. 62/640,495, filed on Mar. 8, 2018.

(51) Int. Cl.
   *G02B 27/34* (2006.01)
   *G01S 5/16* (2006.01)
   (Continued)

(52) U.S. Cl.
   CPC ............... *G02B 27/34* (2013.01); *G01S 5/16* (2013.01); *G02B 5/124* (2013.01); *G02B 5/208* (2013.01);
   (Continued)

(58) Field of Classification Search
   CPC ... G02B 27/01–0189; G02B 2027/0105–0198; G06F 3/011–017; G06T 19/006; H04N 13/332
   See application file for complete search history.

(56) References Cited

U.S. PATENT DOCUMENTS 6,696,126 B1 *  2/2004  Fischer ............... G02B 5/128
                                                        359/515
9,734,442 B2   8/2017  Zwirner et al.
                        (Continued)

FOREIGN PATENT DOCUMENTS

JP        6259172 B      12/2017
KR     20120124325 A     11/2012
WO     2014099486 A1      6/2014

OTHER PUBLICATIONS

Kan et al., "Applying QR Code in Augmented Reality Applications", Department of Information and Communication, Yuan-Ze University, Taiwan, VRCAI 2009, Yokohama, Japan, Dec. 14-15, 2009.
(Continued)

*Primary Examiner* — Gene W Lee
(74) *Attorney, Agent, or Firm* — Treyz Law Group, P.C.; G. Victor Treyz; David K. Cole

(57) ABSTRACT

An electronic device may be provided with optical markers. A marker may be formed from a coating. The coating may be patterned to form a two-dimensional optical code or may be patterned to form an outline or other recognizable marker structure that helps provide information about an electronic device. A device with a sensor such as a depth sensor or other sensor may gather information on the electronic device and its markers. This information may include information on images captured with an image sensor while the electronic device is illuminated by one or more light beams from the depth sensor or other light sources. Markers may be configured to serve as mixed reality optical markers in a mixed reality system. Analysis of the mixed reality marker images or other sensor data may reveal information on device type, device location, device size, device orientation, and other information on a marked device.

13 Claims, 7 Drawing Sheets

(51) Int. Cl.
    *G02B 27/01*     (2006.01)
    *G06F 3/01*     (2006.01)
    *G06F 3/03*     (2006.01)
    *G06T 19/00*     (2011.01)
    *G02B 5/20*     (2006.01)
    *G02B 5/28*     (2006.01)
    *G02B 5/124*     (2006.01)
    *H04M 1/02*     (2006.01)
    *G06T 7/73*     (2017.01)

(52) U.S. Cl.
    CPC ......... *G02B 5/281* (2013.01); *G02B 27/0172* (2013.01); *G06F 3/011* (2013.01); *G06F 3/0317* (2013.01); *G06T 7/73* (2017.01); *G06T 19/006* (2013.01); *H04M 1/0283* (2013.01); *G02B 2027/014* (2013.01); *G02B 2027/0138* (2013.01); *G02B 2027/0187* (2013.01); *G02B 2027/0198* (2013.01); *G06T 2207/30204* (2013.01)

(56) References Cited

U.S. PATENT DOCUMENTS

| | | | |
|---|---|---|---|
| 2002/0090492 A1* | 7/2002 | Haunschild | E01F 9/619 428/141 |
| 2009/0267921 A1* | 10/2009 | Pryor | B60K 35/00 345/177 |
| 2011/0214082 A1 | 9/2011 | Osterhout et al. | |
| 2012/0102438 A1 | 4/2012 | Robinson et al. | |
| 2013/0193211 A1 | 8/2013 | Baqai et al. | |
| 2013/0278635 A1 | 10/2013 | Maggiore | |
| 2014/0160157 A1* | 6/2014 | Poulos | G06F 3/011 345/633 |
| 2015/0185375 A1* | 7/2015 | Hannington | G02B 5/128 359/540 |
| 2015/0317923 A1 | 11/2015 | Edmonds et al. | |
| 2016/0140930 A1 | 5/2016 | Pusch et al. | |
| 2016/0339337 A1 | 11/2016 | Ellsworth et al. | |
| 2017/0011553 A1* | 1/2017 | Chen | G06F 3/005 |
| 2017/0249726 A1* | 8/2017 | Rochford | G06K 9/00604 |
| 2017/0337706 A1* | 11/2017 | Marsh | H04N 5/33 |
| 2018/0299972 A1* | 10/2018 | Saito | G06F 3/002 |
| 2019/0043260 A1* | 2/2019 | Anderson | G06F 3/017 |

OTHER PUBLICATIONS

Can a QR Code be Rotated, QR Codes—Everything You Need to Know, Feb. 2017. http://qrcode.meetheed.com/question1.php.

* cited by examiner

ELECTRONIC DEVICES WITH OPTICAL MARKERS

This application claims the benefit of provisional patent application No. 62/640,495, filed Mar. 8, 2018, which is hereby incorporated by reference herein in its entirety.

BACKGROUND

This relates generally to electronic devices, and, more particularly, to the optical characteristics of electronic devices.

Mixed reality systems have head-wearable devices that display computer-generated content overlaid on real-world content. A user may have a cellular telephone or other electronic devices in addition to a head-wearable device. It can be difficult or impossible for mixed reality headsets to recognize the presence of cellular telephones and other such devices in the user's field of view. This may make it difficult or impossible to provide a user with mixed-reality features that take advantage of the presence of such electronic devices. In some situations, the visual appearance of cellular telephones and other electronic devices may not be satisfactory.

SUMMARY

An electronic device may be provided with optically distinguishable markers. A marker may be formed from a patterned coating or other structure with predefined optical characteristics. The marker may be visible in visible light illumination and/or may be detectable using infrared and/or ultraviolet light sensors. By processing sensor readings such as captured images that contain the markers, information on the electronic device can be obtained. For example, analysis of images containing the markers in a system may reveal information on device type, device location, device size, device orientation, and other information on a marked device.

Markers can be formed from coating layers such as thin-film interference coating layers, photoluminescent coating layers, and/or retroreflective coating layers. A marker may be patterned to form a two-dimensional bar code, may be patterned to form an outline or other recognizable marker structure, and/or may be used in forming other recognizable marker structures to help provide information about an electronic device.

In some configurations such as in mixed reality systems, a device with a sensor such as a depth sensor or other sensor may gather information on the markers of an electronic device. The device with the sensor can use this information in performing functions such as overlaying computer-generated content on real-world images that include marked devices. The information that is gathered may include images captured with an image sensor in a depth sensor while the electronic device is illuminated by one or more light beams from the depth sensor or other light sources. In this type of arrangement, markers may be configured to serve as mixed reality markers.

If desired, markers may be configured to highlight portions of an electronic device such as electronic device buttons (e.g., by placing the markers on movable button members or touch sensor button locations), may be configured to provide moving animated graphics (e.g., in lighting environments with pulsed light at different wavelengths), and/or may otherwise be used in providing electronic devices with desired optical properties.

DETAILED DESCRIPTION

A user may use one or more electronic devices. These electronic devices may include cellular telephones, accessories, and other devices. The user may also have a mixed reality head-mounted device. The head-mounted device may have cameras and other sensors that gather information on the location of real-world objects. The head-mounted device may use this information to overlay computer-generated content on top of real-world content.

To ensure accurate recognition of the presence of cellular telephones and other electronic devices in the field-of-view of a head-mounted device in a mixed reality system, cellular telephones and other electronic devices may be provided with optically distinguishable markers (sometimes referred to as optical markers or visual markers). The markers can be formed from patterned material that facilitates detection of the position of marked devices within the user's environment and/or that helps provide other information (e.g., device identifier information).

If desired, markers may be formed from material that exhibits recognizable spectral responses (sometimes referred to as spectral reflectance codes), retroreflective materials, photoluminescent material, thin-film interference filter layers, and other materials that help a head-mounted device or other device with sensors to gather information on electronic devices in the user's environment. Spectral reflectance codes formed in markers and other marker attributes may be used as device type identifiers, may convey information on the location, shape, orientation, and size of a device, or may be used to convey other information.

Markers may be formed from coatings or other structures. Markers may form coded patterns, patterns that serve to outline a device, and/or other patterns. Thin-film interference filter layers, layers of retroreflective material, thin-film interference filters, colored materials, and/or other types of structures may be used to highlight buttons and other device structures. Information on markers that is detected by an electronic device such as a head-mounted device may be used in registering computer-generated content to real-world content (e.g., presenting overlays of computer-generated content that are aligned with all or part of a cellular telephone or other device), may be used in identifying which accessories and/or other devices a user has available for use in a system, may be used in coordinating the operation of multiple electronic devices (e.g., to display content across multiple devices, to use one device as a master and one as a slave, to support system functions that depend on the relative orientation of multiple devices, etc.), and/or may be used to facilitate the implementation of other enhanced functionality in a system with multiple electronic devices.

Figure 1:
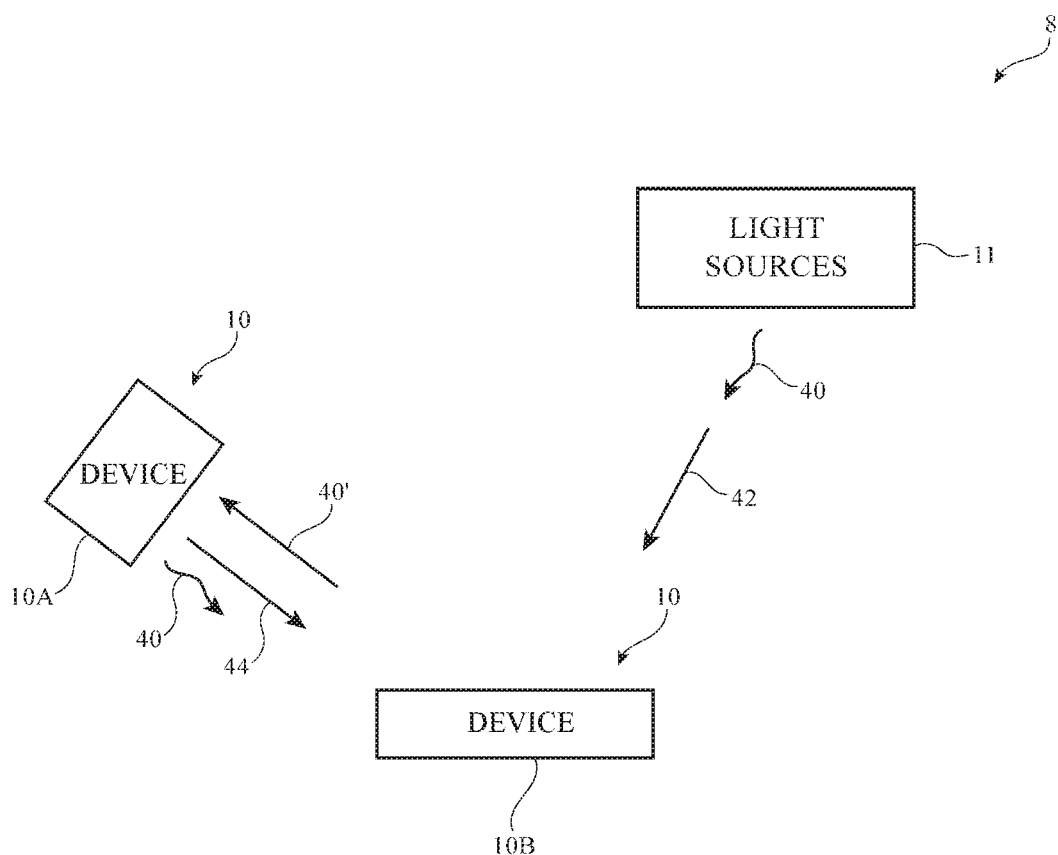
FIG. 1 is a schematic diagram of an illustrative system with electronic devices in accordance with an embodiment.

An illustrative system that includes multiple electronic devices is shown in FIG. 1. As shown in FIG. 1, system 8 includes electronic devices such as electronic devices 10. System 8 may, for example, include two or more devices 10, three or more devices 10, five or more devices 10, fewer than 100 devices 10, fewer than 25 devices 10, fewer than 10 devices 10, and/or other suitable number of devices 10. Devices 10 may include one or more devices 10A that acquire information on surrounding devices and one or more devices 10B that have markers to facilitate the acquisition of such information by devices 10A. As one example, device 10A may be a head-mounted device that has a camera, structured light depth sensor, and other sensors for acquiring data in system 8 and device 10B may be a cellular telephone, or other device in system 8 that has optical markers (e.g., optical mixed reality system markers) that help device 10A identify and locate device 10B relative to device 10A. In this type of environment, device 10A may provide a user with mixed reality content and system 8 may sometimes be referred to as a mixed reality system.

In general, devices 10A and 10B may be any suitable devices such as cellular telephones, electronic wrist watch devices, tablet computers, desktop computers, laptop computers, televisions, electronic devices with displays and other component that are part of furniture, vehicles or other embedded systems, wearable devices such as wrist bands, head bands, clothing, hats, head-mounted devices (e.g., glasses, googles, helmets, etc.), wireless pencils for providing a tablet computer with input, computer mice, keyboards, ear buds, and/or other accessories, and/or other electronic equipment. If desired, a device 10 may include both optical makers for enhancing recognition by other devices and sensors for recognizing such devices (e.g., the features of devices 10A and 10B need not be mutually exclusive). For example, a cellular telephone, head-mounted display, or other electronic device may include both markers for facilitating detection by sensors and may include sensors for performing detection operations.

As shown in FIG. 1, device 10B may be illuminated by light 40. Light 40 may be produced by devices such as device 10A (e.g., light emitted from a sensor such as a depth sensor) and/or may be produced by one or more other light sources 11. Light sources 11 may include the sun for producing natural light and/or may include artificial light sources (e.g., fluorescent lights, incandescent lights, visible light sources such as visible-light light-emitting diodes, halogen lights, and/or other indoor and/or outdoor artificial visible light sources). In some configurations, light sources 11 may include light sources (e.g., light-emitting diodes, lasers, lamps, etc.) that produce non-visible light (e.g., infrared light at one or more wavelengths and/or ultraviolet light at one or more wavelengths). In some configurations, light sources 11 may produce pulsed light at one or more desired wavelengths in one or more desired pulse patterns. In general, light sources 11 and/or light sources in devices 10 may include any one or more sources of artificial and/or natural light at one or more wavelengths (infrared, visible, and/or ultraviolet).

Light 40 that is emitted by external light sources 11 may be emitted in direction 42 to illuminate device 10B. Light 40 that is emitted by light sources in device 10A may be emitted in direction 44 to illuminate device 10B. Device 10B may have optical markers (markers that are recognizable optically under infrared light, visible light, and/or ultraviolet light illumination) that reflect light 40 (e.g., as specular reflections, retro-reflected light, and/or diffusely scattered light), Reflected light 40' may be detected by sensors in device 10A. If desired, device 10B may also include light sources (light-emitting diodes, lasers, lamps, etc.) that produce light for detection by device 10A (e.g., visible, infrared, and/or ultraviolet light).

To enhance the appearance of devices 10 (e.g., to enhance the appearance of a device such as device 10B to the naked eye of a user), it may be desirable to provide devices 10 with patterned structures that are visible to the user and that provide devices 10 with a desired appearance. As an example, trim structures in devices 10, buttons (e.g., movable button members or touch sensitive button locations), housing structures, and/or other structures may be provided with patterned structures. These patterned structures, which may sometimes be referred to as visible-light markers, may help distinguish particular buttons from each other, may help highlight the outline of a device or component, and/or may provide other information about devices 10 and/or the use of devices 10. Markers may also be used as bar codes or other optical codes (e.g., two-dimensional matrix bar codes such as Quick Response Codes or other codes), alignment features (e.g., to inform device 10A of the shape and position of device 10B in system 8), etc. Markers such as these may operate at visible wavelengths and/or other wavelengths. For example, markers may operate at infrared wavelengths (while being visible or invisible to a user's naked eye at visible wavelengths), may operate at ultraviolet wavelengths, may operate at multiple wavelengths, etc.

Figure 2:
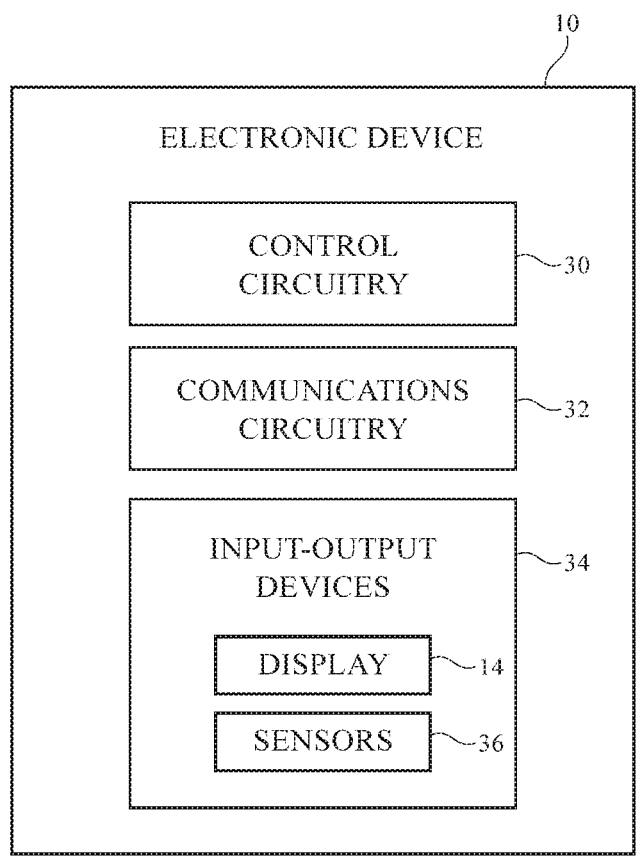
FIG. 2 is a schematic diagram of an illustrative electronic device in accordance with an embodiment.

FIG. 2 is a schematic diagram of an illustrative electronic device. Devices such as illustrative device 10 of FIG. 2 may be used as device 10A and/or device 10B of FIG. 1. As shown in FIG. 2, electronic device 10 may have control circuitry 30. Control circuitry 30 may include storage and processing circuitry such as processing circuitry associated with microprocessors, power management units, baseband processors, digital signal processors, microcontrollers, and/or application-specific integrated circuits with processing circuits. Control circuitry 30 may implement desired control and communications features in device 10. For example, control circuitry 30 may be used in gathering data, processing gathered data, and taking suitable actions based on the gathered data. Control circuitry 30 may be configured to perform these operations using hardware (e.g., dedicated hardware or circuitry), firmware, and/or software. Software code for performing these activities may be stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, etc. Software stored on non-transitory computer readable storage media may be executed on the processing circuitry of control circuitry 30. The processing circuitry may include application-specific integrated circuits with processing circuitry, one or more microprocessors, or other processing circuitry.

Device 10 may have communications circuitry 32. Communications circuitry 32 may include wired communications circuitry (e.g., circuitry for transmitting and/or receiving digital and/or analog signals via a port associated with a connector) and may include wireless communications circuitry (e.g., radio-frequency transceivers and antennas) for supporting communications with wireless equipment. Wireless communications circuitry in circuitry 32 may include wireless local area network circuitry (e.g., WiFi® circuitry), cellular telephone transceiver circuitry, satellite positioning system receiver circuitry (e.g., a Global Positioning System receiver for determining location, velocity, etc.), near-field communications circuitry and/or other wireless communications circuitry. Using communications circuitry 32, devices 10 in system 8 may communicate with each other (e.g., so that one device can gather input that is transmitted to another device to control that device).

Device 10 may use input-output devices 34 to receive input from a user and the operating environment of device 10 and to provide output. Input-output devices 34 may include one or more visual output devices such as display 14 (e.g., a liquid crystal display, an organic light-emitting diode display, or other display). Input-output devices 34 may also include buttons, joysticks, scrolling wheels, touch pads, key pads, keyboards, microphones, speakers, displays (e.g., touch screen displays), tone generators, vibrators (e.g., piezoelectric vibrating components, etc.), sensors, light-emitting diodes and other status indicators, data ports, etc. Sensors 36 in input-output devices 34 may include force sensors, touch sensors, gesture sensors, capacitive proximity sensors, optical proximity sensors, ambient light sensors, temperature sensors, air pressure sensors, gas sensors, particulate sensors, magnetic sensors, motion and orientation sensors (e.g., inertial measurement units based on one or more sensors such as accelerometer, gyroscopes, and magnetometers), strain gauges, sensors that include image sensors (cameras) operating at infrared, visible, and/or ultraviolet wavelengths, depth sensors (e.g., structured light depth sensors that emit beams of light in a grid or other pattern and that have image sensors to measure resulting spots of light produced on target objects), sensors that gather three-dimensional depth information using a pair of stereoscopic sensors, lidar (light detection and ranging) sensors, radar sensors, radio-frequency sensors (e.g., millimeter wave systems) for gathering two-dimensional or three-dimensional millimeter wave images of a user's surroundings, etc.

Figure 3:
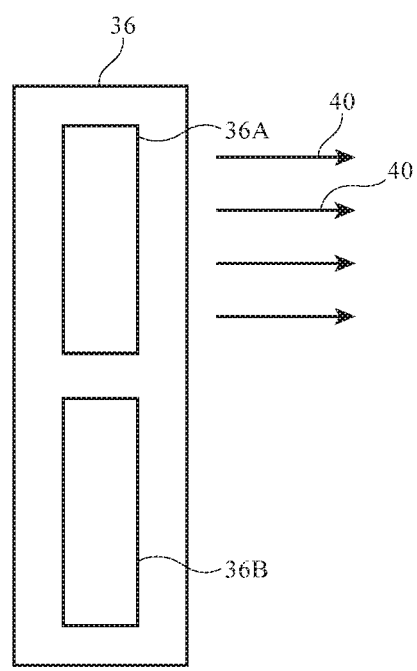
FIG. 3 is a diagram of an illustrative sensor in an electronic device in accordance with an embodiment.

FIG. 3 is a diagram of an illustrative light-based sensor such as a depth sensor. As shown in FIG. 3, sensor 36 may include an image sensor or other light detector (see, e.g., two-dimensional digital image sensor 36B). Image sensor 36B may operate at infrared, visible, and/or ultraviolet wavelengths. Sensors such as image sensor 36B can capture images of electronic devices, including any markers present on such electronic devices and/or can capture images of other items in a user's surroundings. In some situations, image sensor(s) 36B can capture images of objects (e.g., device 10B) that have been illuminated using blanket natural or artificial illumination from light sources 11. If desired, image sensors 36B can capture images of objects (e.g., device 10B) that are illuminated by output from a camera flash or other light source in device 10A.

In some illustrative configurations, sensor 36 (e.g., a sensor in device 10A) may contain a light source that emits beams of collimated light (sometimes referred to as structured light) from light source 36A. Light source 36A may, as an example, contain a two-dimensional array, of infrared lasers (or lasers operating at visible and/or ultraviolet light wavelengths). This two-dimensional array of lasers or other structured light source may emit an array of light beams (e.g., beams of light 40). Sensor 36B can capture and process images that contain the spots formed when these light beams (structured light) illuminate markers on device 10B and/or other portions of device 10B and the objects surrounding device 10B. By incorporating markers into device 10B, the process of determining the three-dimensional shape of device 10B and the position of device 10B relative to device 10A can be facilitated. In general, any suitable sensors 36 may be provided in devices 10. The use of a structured light depth sensor is illustrative.

Figure 4:
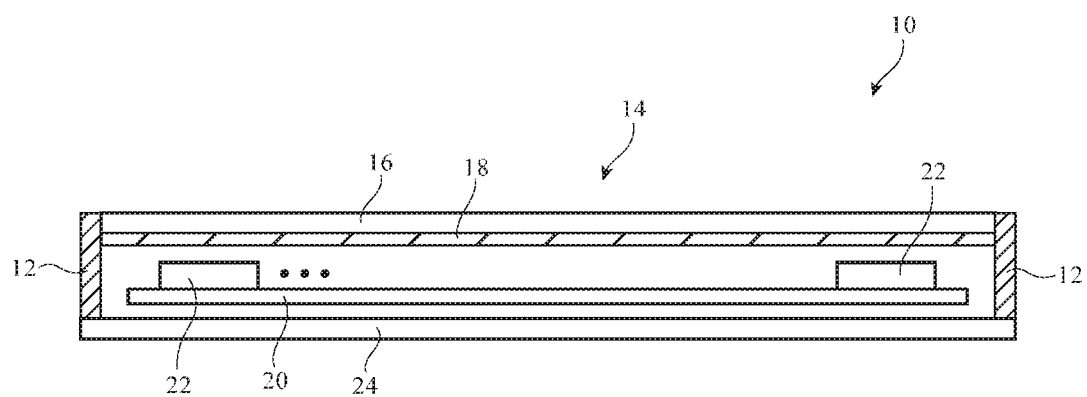
FIG. 4 is a cross-sectional side view of an electronic device in accordance with an embodiment.

FIG. 4 is a cross-sectional side view of a portion of an illustrative device such as device 10 of FIG. 2. As shown in FIG. 4, device 10 may have a display such as display 14. Display 14 may, if desired, be formed on one face of device 10 (e.g., a front side) and a housing structure such as layer 24 may be formed on an opposing face (e.g., a rear side). Other configurations for device 10 may be used, if desired. Device 10 may have sidewall portions such as portions 12. These sidewall portions, the rear housing, and, if desired, other housing portions of the electronic device housing for device 10 may be formed from a material such metal, integral portions of front and/or rear glass layers, polymer, ceramic, other materials and/or combinations of these materials.

Display 14 may include display cover layer 16 (e.g., a layer of glass or clear polymer) and display module 18 (e.g., display layers that form an array of pixels that present images for a user of device 10). Display module 18 may be a liquid crystal display structure, an organic light-emitting diode display structure, an array of micro-light-emitting diodes, or other suitable display. Display 14 (e.g., cover layer 16) and the housing structures of device 10 such as housing 12 and rear layer 24 form an exterior surface for device 10 on which makers can be formed). During operation, module 18, which may sometimes be referred to as a pixel array, may present images that are viewable through display cover layer 16. Internal components in device 10 such as components 22 (e.g., electrical components such as integrated circuits, sensors, etc.) may be mounted on one or more substrates such as printed circuit 20 in the interior of device 10. Device 10 may have a housing shaped to allow device 10 to be worn by a user (e.g., housing structures that are configured to be worn on a user's head or other body part), may have a housing with a rectangular outline (e.g., in configurations in which device 10 is a cellular telephone), and/or may have other suitable housings.

Markers may be formed from patterned coating layers or may be more deeply embedded into portions of devices 10. If desired, markers may be formed from portions of housing structures by incorporating marker materials into an injection molded polymer housing structure, by embedding polymer filler material into holes, grooves, or other openings formed in a metal housing structure, by adding particles or other materials to glass or ceramic housing structures, or by otherwise patterning materials to form optical marker structures as part of an electronic device housing. In some configurations (e.g., when forming markers from coating layers), markers may be formed on the inner and/or outer surface of a substrate layer. As an example, transparent housing layers, transparent display layers, transparent window layers, and/or other transparent members in device 10 may have inner surfaces that are covered with patterned layers that form markers that are visible at an external surface of device 10 through the layers. External coatings can also be formed. Markers may be formed on functional members (e.g., button members that form part of buttons) and/or may be formed on other portions of device 10 (e.g., external surfaces such as those associated with device housing). Illustrative configurations in which markers for devices 10 are formed from coating layer(s) may sometimes be described herein as an example.

Coatings may be formed from metals, semiconductors, and/or dielectrics. Dielectric materials for the coatings may include organic materials such as polymer layers and/or inorganic materials such as oxide layers (e.g., silicon oxide, metal oxides such as aluminum oxide, etc.), nitride layers, and/or other inorganic dielectric materials. If desired, a coating may be formed from a thin-film interference filter layer (sometimes referred to as a dichroic layer). Photoluminescent structures, retroreflective structures, and/or other structures that impart markers with desired optical properties may also be used. In arrangements in which a shiny appearance is desired, a metal coating with a high reflectivity or a thin-film interference filter with dielectric layers (e.g., a stack of dielectric layers of alternating higher and lower refractive index values) may be configured to serve as a mirror coating (reflective coating).

Figure 5:
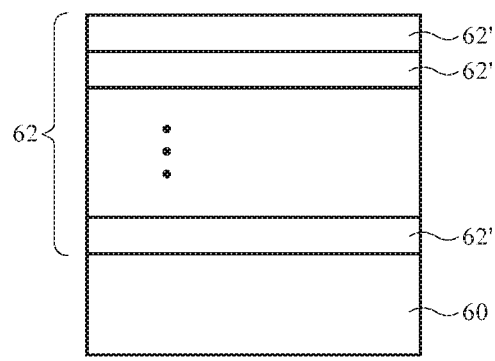
FIG. 5 is a cross-sectional side view of a layer of material made of one or more sublayers that may be formed on a structure in an electronic device in accordance with an embodiment.

An illustrative coating layer of the type that may be used in forming markers in devices 10 is shown in FIG. 5. As shown in FIG. 5, coating layer 62 may be supported by a structure such as structure 60. Structure 60 may be a housing structure (e.g., a housing wall with an externally viewable surface), a transparent member (e.g., a transparent housing structure or a transparent display cover layer that has externally viewable and/or internally viewable surfaces), and/or other structures in device 10 (sometimes referred to as support layers, support structures, substrates, etc.). Layer 62 may be formed on the interior and/or exterior surfaces of structure 60. Layer 62 may have one or more sublayers 62'.

In some configurations, the bulk properties of the one or more sublayers 62' in layer 62 influence the optical properties of layer 62. For example, layer 62 may include colored material (e.g., polymer containing dye and/or pigment) or material that exhibits photoluminescence (photoluminescent dye, phosphors, etc.). This material may be deposited in thin (near a wavelength of light) or thick layers and may be used to adjust light transmission, reflection, and absorption for layer 62.

In other configurations, the thin-film interference properties of layers 62' are used to provide coating layer 62 with desired optical properties. Layer 62 may, as an example, include N sublayers 62' (where N is at least 3, at least 5, at least 7, at least 10, at least 20, at least 40, less than 200, less than 100, or other suitable number) that are each relatively thin (e.g., less than 10 microns, less than 3 microns, at least 0.05 microns, etc.) and that collectively form a thin-film interference filter with desired optical properties such as a desired reflection, transmission, and absorption across appropriate portions of the infrared, visible, and ultraviolet spectrums.

Coating layers 62' may include dielectric layers (e.g., inorganic dielectric layers such as silicon oxide, silicon nitride, titanium oxide, tantalum oxide, zirconium oxide, aluminum oxide, etc. and/or polymer layers). In thin-film interference filter configurations for layer 62, layers 62' may have desired refractive index values such as alternating high and low indices of refraction (e.g., to form a thin-film interference mirror, to form a thin-film interference filter with higher reflectivity at infrared wavelengths than at visible light wavelengths, etc.). If desired, metal layers, semiconductor layers, and/or other layers of material may be incorporated into layer 62.

Figure 6:
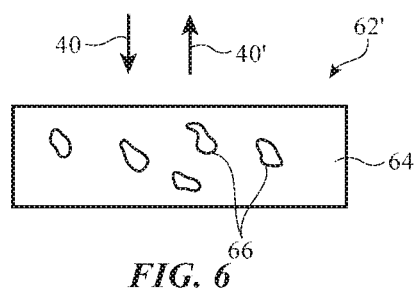
FIG. 6 is a cross-sectional side view of an illustrative layer of material with particles in accordance with an embodiment.

As shown in FIG. 6, one or more of layers 62' may be formed from material 64 with embedded particles 66. Particles 66 may include light-scattering particles (e.g., materials with a refractive index of at least 1.8, at least 1.9, at least 2.0, less than 2.1, or other suitable materials that exhibit high scattering when embedded in materials of lower refractive index). Material 64 may be a dielectric such as a polymer or an inorganic material with a refractive index different than the refractive index of particles 66. In some configurations, particles 66 may be formed from hollow microspheres, particles of low refractive index material, and/or other low-index structures.

In some configurations, particles 66 may be photoluminescent and may emit light at one or more selected wavelengths in response to application of pump light (e.g., light 40 at one or more wavelengths that are shorter than the emitted wavelengths). Particles 66 may also form reflective surfaces to help reflect light 40. If desired, particles 66 and/or material 64 may have bulk absorption properties with desired optical characteristics. For example, particles 66 and/or material 64 may reflect more infrared light than visible light, so that infrared beams of light 40 from sensor 36 (FIG. 3) will reflect strongly (see, e.g., reflected light 40') and therefore have enhanced visibility to sensor 36B without making the marker formed from layer 62' unnecessarily visible to the user.

Figure 7:
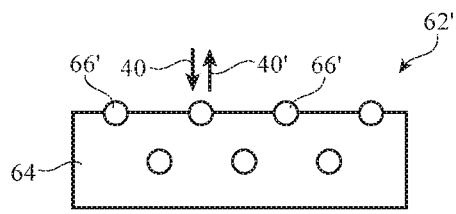
FIGS. 7 and 8 are cross-sectional side views of illustrative layers of material with retroreflective surface properties in accordance with embodiments.

FIG. 7 is a cross-sectional side view of layer 62' in an illustrative configuration in which layer 62' has a retroreflective surface. Layer 62' of FIG. 7 may, as an example, be the uppermost or a nearly uppermost one of layers 62' in layer 62. Particles 66' may be spheres (e.g., glass spheres) or other retroreflective particles. Using these particles, incoming rays of light 40 will be reflected backwards towards the source of light 40 (e.g., reflected rays 40' will trace the paths of incoming rays 40). This type of arrangement may be used to help make markers on device 10B strongly visible to sensor(s) in device 10A (e.g., by enhancing the reflection of light 40 that is emitted by light-emitting component 36A of FIG. 3 towards image sensor 36B of FIG. 3). A retroreflective layer formed from layer 62' of FIG. 7 may be formed as the uppermost layer 62' (or sole layer 62') in coating layer 62 (as an example).

Figure 8:
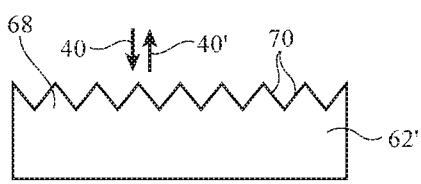

As shown in FIG. 8, other types of retroreflective surfaces may be formed for makers in devices 10. In the example of FIG. 8, a textured surface has been formed on layer 62'. The textured surface has protrusions 68 and forms reflective angled surfaces 70 for retroreflectors. This causes incoming rays of light 40 to be reflected backwards (retroreflected) along their incoming paths as light 40'. If desired, retroreflective surfaces may be formed from combinations of the retroreflective surface structures of FIGS. 7 and 8 and/or from other retroreflective coatings. The examples of FIGS. 7 and 8 are illustrative.

Figure 9:
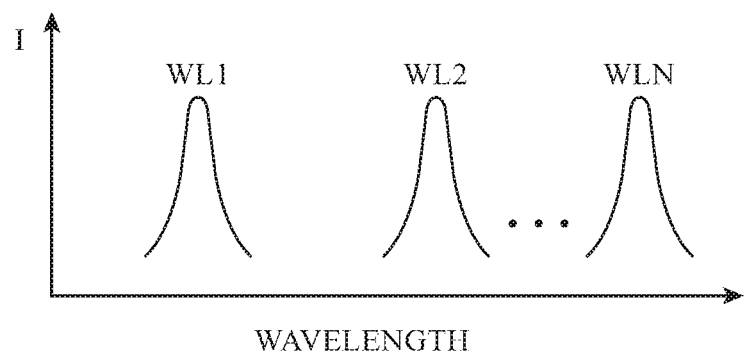
FIG. 9 is a graph showing illustrative light intensity profiles associated with light in an electronic device system of the type shown in FIG. 1.

FIG. 9 shows how photoluminescent material in layer 62 can be used to create emitted light at one or more wavelengths of interest. During operation of devices 10 in system 8, light sources 11 and/or a light source(s) in device 10A may emit pump light at one or more pump light wavelengths (see, e.g., pump light at wavelength WL1). The pump light may be ultraviolet light, visible light, and/or infrared light. Due to the presence of photoluminescent material in layer 62, the pump light causes the photoluminescent material to emit light at one or more longer wavelengths (e.g., wavelengths WL2 . . . WLN) in accordance with the principals of photoluminescence. A marker that emits light at these particular known wavelengths can be detected using an image sensor (see, e.g., sensor 36B of FIG. 3) or other light-based detector(s). By analyzing the spectral composition of the reflected light (light 40') from the marker and other attributes of the marker (e.g., the shape of the marker, etc.), device 10A can obtain information on device 10B (e.g., device type, device position relative to device 10A, device shape, device location, etc.). As an example, a first coating layer that emits light at wavelengths w1 and w2 may be used in forming a marker for a cellular telephone and a second coating layer that emits light at different wavelengths w3 and w4 may be used in forming a marker for a wrist watch device. By analyzing the spectrum of the reflected light 40' from a marker on a target device (e.g., using a color digital image sensor or other sensor that analyzes the spectrum of reflected light 40' from the marker), device 10A can determine whether a given device that is in the field of view of device 10A is a cellular telephone or a watch or can extract other information about device 10B.

Figure 10:
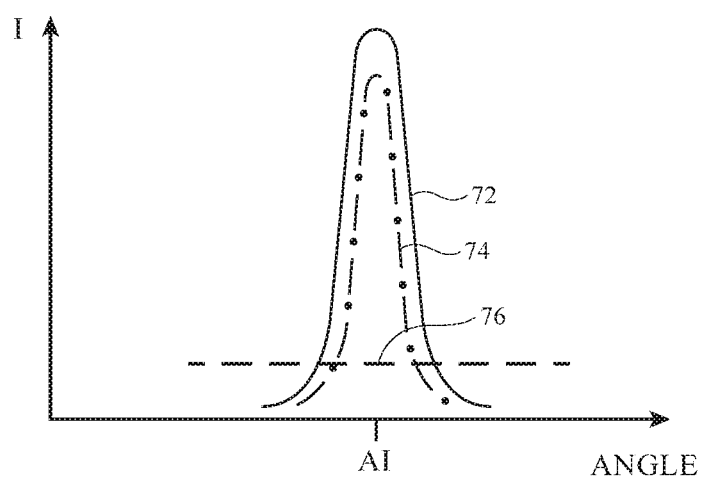
FIG. 10 is a graph showing how light intensity may vary as a function of angle in a system with a retroreflective surface in accordance with an embodiment.

In configurations for system 8 in which device 10B includes retroreflective structures (e.g., markers formed from a retroreflective coating), incident light will be reflected back towards its source along the same path as original incident light. Consider, as an example, the scenario illustrated in FIG. 10 in which light 40 is incident on device 10B at an angle of AI (e.g., an angle AI relative to the surface normal of a retroreflective marker surface on device 10B). This light 40 may have an intensity-versus-angle profile such as intensity profile 72. In the absence of retroreflective marker structures, light 40 will be weakly reflected back along angle AI (see, e.g., light intensity profile 76, corresponding to evenly scattered light from a non-retroreflective surface such as light that is diffusely reflected). In the presence of retroreflective structures (e.g., markers formed from a retroreflective coating layer 62 that includes retroreflective layer 62' of FIG. 7 and/or FIG. 8), reflected light 40' will have an intensity profile of the type shown by profile 74 (i.e., reflected light 40' will have a strong intensity along a path with the same angular orientation relative to the surface normal of the marker 62 as incoming light 40).

Figure 11:
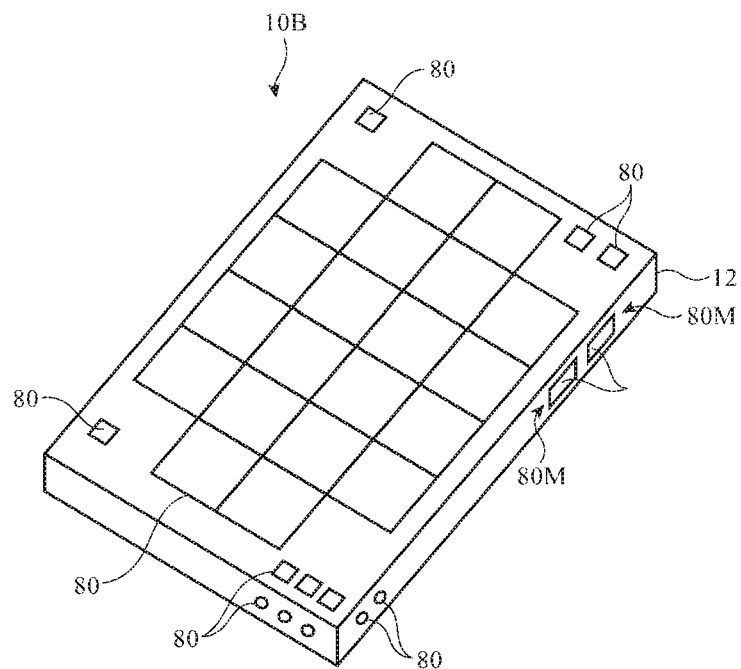
FIG. 11 is a perspective view of an illustrative electronic device with markers in accordance with an embodiment.

FIG. 11 is a perspective view of an illustrative electronic device 10B with illustrative optical marker structures (optical markers) 80. Markers 80 may be formed from patterned coatings such as coating 62 of FIG. 5 and/or other marker structures (e.g., markers formed in openings in housing layers, markers formed from portions of housing structures or other device structures containing marker material, etc.). Coatings such as coating 62 may be patterned using lift-off techniques, etching, shadow mask deposition techniques, machining, laser patterning, and/or other suitable patterning techniques. Coating 62 may be patterned to form crosses, dots, squares, asymmetrical shapes (e.g., asymmetrical crosses, asymmetrical spots, etc.), grids (see, e.g., the grid-shaped marker 80 in the center of device 10B of FIG. 11), rings (e.g., peripheral rings that run along some or all of the periphery of device 10B), etc. Buttons with switches and movable button members and/or touch sensor buttons may be labeled with markers 80 (see, e.g., buttons 80M).

In some configurations, markers 80 may be distributed evenly (e.g., there may be at least one marker 80 at each of the four corners of device 10 to help demarcate the outline of device 10). In other configurations, markers 80 may be distributed in a pattern that allows device 10A to determine whether device 10B has been rotated, flipped, etc. For example, different corners of the housing of device 10B may be provide with different numbers of markers 80, so that device 10A can determine whether device 10B has been rotated (e.g., in the plane of a surface on which device 109 is resting). Markers 80 may be formed on a rear face of device 10B, on a front face of device 10B, on portions of a housing sidewall and/or sidewall-mounted buttons on device 10B, and/or on other suitable portions of device 109.

Figure 12:
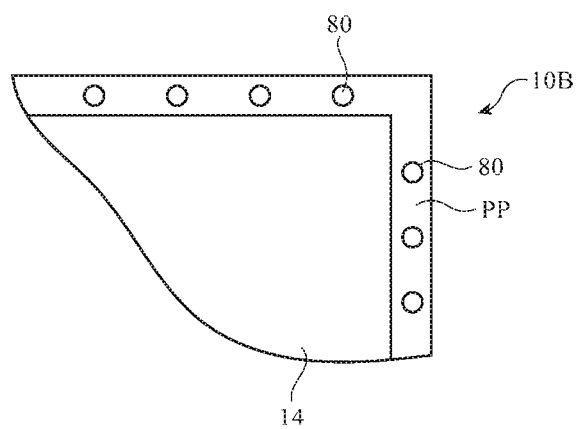
FIG. 12 is a top view of a corner portion of an electronic device with peripheral markers in accordance with an embodiment.

FIG. 12 is a top view of a corner portion of device 10B showing how markers 80 may be formed along a peripheral edge portion PP of device 10B (e.g., a peripheral housing structure, such as a metal peripheral housing band, a peripheral housing structure such as a sidewall that runs around the periphery of device 10B and that forms an integral portion of a planar rear wall, other structures that form a bezel or trim for display 14 or other components in device 10B, etc.). In the example of FIG. 12, there are a series of markers 80 along the peripheral edge of device 109. If desired, a single strip-shaped marker or other marker pattern may be used to indicate where the periphery of device 10B is located.

During operation, device 10A can use sensors 36 to form digital images of device 10B at one or more wavelengths or can otherwise use sensors 36 to make spectral measurements and/or other light-based measurements on device 10B. Markers on device 10B may be coded using predetermined patterns of color, reflectivity, light absorption, light transmission, marker shape, marker orientation, etc. In some configurations, markers 10B may form two-dimensional bar codes or other encoded optical patterns that contain information about device 10B (e.g., device type, device serial number or other identifying information, etc.). Such codes may, as an example, be device-specific or device-model-specific (device-type-specific) codes. When one or more devices 10B are in the presence of device 10A, device 10A can sense each device 10B (e.g., using imaging and other light-based detection techniques and, if appropriate, bar code decoding operations) using sensors 36. This sensing operation may involve emitting structured light, scanning beam(s), blanket illumination, or other device-emitted light 40 and/or may involve the use of one or more natural and/or artificial external light sources 11 to emit light 40.

Emitted light 40 may have predetermined spatial characteristics (e.g., light 40 may be structured light emitted in an array of parallel beams), may have predetermined spectral characteristics (e.g., light 40 may contain one or more predetermined wavelengths of light), may have predetermined temporal characteristics (e.g., light 40 at one or more different wavelengths may be emitted in a predetermined pattern of pulses), and/or may have other known characteristics. Markers 80 may contain spectral reflectance codes (known reflectance versus wavelength characteristics) and other predefined properties that help markers 80 convey desired information about devices 10B to device 10A. As a result of the interplay between emitted light 40 and the markers 80 on each device 10B that is illuminated by emitted light 40, reflected light 40' will be produced with corresponding characteristics. For example, if light 40 contains light at wavelengths wa, wb, and wc and if a given marker 80 in device 10 is configured to reflect 80% of the light at wavelength wa, 30% of the light at wavelength wb, and 50% of the light at wavelength wc, device 10A can determine whether the given marker (and device 10B) are present by analyzing the amount of light 40 that is received as reflected light 40' at each of these three wavelengths.

If it is desired to provide buttons or other device structures on device 10B with different visible-light appearances during exposure to different lighting conditions, the buttons and other portions of device 10B (e.g., surrounding housing structures) can be provide with appropriate marker coatings. If, as an example, it is desirable to highlight a button that can be pressed to help a user cause device 10A to output warm (low color temperature) flash illumination during fluorescent ambient lighting conditions, that button and surrounding housing structures can be provided with respective coatings having tuned light reflection spectra so that the button appears brighter than the surrounding structures in device 10B in fluorescent lighting, but that appears to have the same brightness than the surrounding structures in sunlight.

In some arrangements, coatings 62 can be patterned to reflect and/or luminesce in response to a time-varying pattern of light at one or more wavelengths from light sources 11. Animated effects may be produced when light 40 from light sources 11 has a particular pulse sequence. For example, a first layer 62 may form a first pattern that reflects light in a narrow wavelength range around wavelength wla (e.g., by forming a thin-film interference filter that reflects light only in this range) and second and third layers 62 may form second and third patterns that respectively reflect light in narrow wavelength ranges around wavelengths wlb and wlc. Light sources 11 may cycle in sequence outputting light pulses of respective wavelengths wla, wlb, and wlc to produce an animated pattern formed by alternating the reflected light repeatedly between the first, second, and third patterns. This technique may be used to form chasing light patterns, moving animated characters, etc.

In mixed reality environments, device 10A can use markers (e.g., retroreflective markers and/or markers tagged using photoluminescent material, thin-film interference filters with known spectral properties, markers with known asymmetrical patterns such as asymmetric shapes and/or layouts, etc.) to help identify each device 10B in the field-of-view of the user (e.g., the field-of-view of sensor 36B and/or other image sensor devices) and to help determine the locations of displays 14 and other components within these devices 10B. Device 10A can use image processing techniques (e.g., pattern recognition) to determine when markers 80 are present and to extract desired information from the detected markers. For example, device 10A can process sensor data from sensors 36 to identify devices 10B, to identify the location of devices 10B (e.g., the direction and distance from device 10B), to identify the rotational orientation of each device 10B (e.g., its rotational orientation on a table or other support surface), to identify the outline of each device 10B, to determine the location of housing edges, display edges, and/or other device features, and/or to extract other information about each of devices 10B. Device 10A can then use its display to take appropriate action (e.g., by overlaying computer-generated content that is precisely aligned with the detected edges of displays 14 on devices 10B, to overlay content that completely or partly obscures each device 10B, to outline or otherwise visually highlight the locations of detected devices 10B (e.g., to allow a user to readily locate and use devices 10B), etc.

Devices 10B can be used as input devices (e.g., game controllers, navigation devices, microphones, etc.). The buttons, touch screens, gesture recognition devices and other input-output devices in each device 10B can be used as input and/or devices 10B can be used to gather input in other ways. As an example, a user wave a device 10B (e.g., a keyboard) in the air and device 10A may use the detected motion of device 10B as input to move a virtual object being displayed by device 10A to the user. As another example, device 10A may overlay images over displays 14 in devices 10B (e.g., to create an alternative reality in which all or part of the images on devices 10B are altered by device 10A). Yet another example involves highlighting a mouse or other input devices by creating a flashing icon or other visually prominent computer-generated object that is placed on or adjacent to a detected device 10B in the user's field of view. Device 10A can use this technique to help a user locate devices 10B while operating in a mixed reality environment. Devices 10B can also be provided with virtual buttons and other augmented features by overlapping virtual button regions with particular portions of devices 10B (as identified using pattern recognition of markers 80 and/or other detectable features of devices 10B that are sensed using sensors 36). Because markers 80 can be used as optical markers in mixed reality systems (e.g., markers that device 10A can optically detect to determine the location, orientation, and other attributes of devices 10B), markers 80 of this type may sometimes be referred to as mixed reality optical markers, optical mixed reality system markers, visual mixed reality markers, mixed reality markers, or mixed reality alignment features. To hide markers 80 from view in visible light conditions while allowing alignment markers 80 to be viewed by device 10A at infrared wavelengths, markers 80 can be buried under a coating layer that is transparent at infrared wavelengths and opaque at visible wavelengths (e.g., an upper one or more of layers 62' may be an infrared-light-transmitting-and-visible-light-blocking layer formed from a thin-film interference filter, a polymer layer with visible-light-absorbing material that is transparent to infrared light, etc.).

The foregoing is merely illustrative and various modifications can be made to the described embodiments. The foregoing embodiments may be implemented individually or in any combination.

What is claimed is:

1. An electronic device operable with a light source, comprising:
    a housing;
    electrical components in the housing including a display; and
    a mixed reality system optical marker on an exterior surface of the housing, wherein the mixed reality system optical marker includes photoluminescent material formed from discrete particles in a polymer layer, wherein the photoluminescent material is configured to emit infrared light in response to light from the light source, and wherein the infrared light emitted by the photoluminescent material has a longer wavelength than the light from the light source.

2. The electronic device defined in claim 1 wherein the mixed reality system optical marker is configured to provide visual information on an orientation of the housing.

3. The electronic device defined in claim 1 wherein the mixed reality system optical marker includes a two-dimensional bar code.

4. The electronic device defined in claim 1 further comprising an additional mixed reality system optical marker that includes a retroreflective layer.

5. The electronic device defined in claim 1 further comprising an additional mixed reality system optical marker that includes a retroreflective layer that has a polymer layer and transparent spheres that protrude partly out of the polymer layer.

6. The electronic device defined in claim 1 further comprising a button, wherein the mixed reality system optical marker is formed on the button.

7. The electronic device defined in claim 1 wherein the mixed reality system optical marker runs along at least one peripheral edge of the housing.

8. The electronic device defined in claim 1 wherein the mixed reality system optical marker includes material configured to form a spectral reflectance code that identifies the electronic device.

9. A mixed reality system, comprising:
   a first electronic device having a first electronic device housing, first electronic device components in the first electronic device housing, a first display in the first electronic device housing, mixed reality system optical markers on the first electronic device housing, and first control circuitry configured to display images on the first display; and
   a second electronic device having a second electronic device housing, a second display in the second electronic device housing, second control circuitry in the second electronic device housing, and a sensor, wherein the sensor comprises a structured light depth sensor having a light emitter configured to emit a set of infrared light beams and an image sensor configured to capture images of the mixed reality system optical markers illuminated by spots produced by the infrared light beams, and wherein the second control circuitry of the second electronic device is configured to:
   gather information on the mixed reality system optical markers with the sensor;
   determine a location of the first electronic device by analyzing the gathered information on the mixed reality system optical markers; and
   display content using the second display based on the determined location of the first electronic device while the first control circuitry displays images on the first display, wherein the content overlaps the first electronic device housing.

10. The mixed reality system defined in claim 9 wherein the mixed reality system optical markers include at least one coating selected from the group consisting of: a thin-film interference coating, a photoluminescent coating, and a retroreflector coating.

11. The mixed reality system defined in claim 10 wherein the second electronic device comprises a head-mounted mixed reality device and wherein the first electronic device comprises a cellular telephone.

12. The mixed reality system defined in claim 11 wherein the mixed reality system optical markers include at least one two-dimensional bar code.

13. The mixed reality system defined in claim 10 wherein the mixed reality system optical markers are configured to provide the sensor with information on size and orientation of the first electronic device.

* * * * *